(12) United States Patent
Hattiangadi et al.

(10) Patent No.: US 8,117,534 B1
(45) Date of Patent: Feb. 14, 2012

(54) CONTEXT TRANSLATION

(75) Inventors: Anand Hattiangadi, Mountain View, CA (US); James Andrew Clark, Sunnyvale, CA (US); Konstantin Krupnikov, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 1777 days.

(21) Appl. No.: 10/865,177

(22) Filed: Jun. 9, 2004

(51) Int. Cl.
*G06F 17/00* (2006.01)

(52) U.S. Cl. .................. 715/234; 715/237; 715/255

(58) Field of Classification Search .......... 709/217–219, 709/224; 715/500, 513, 200, 234, 237, 255
See application file for complete search history.

(56) References Cited

U.S. PATENT DOCUMENTS

| 6,003,078 | A | * | 12/1999 | Kodimer et al. .............. 709/224 |
| 6,915,456 | B2 | | 7/2005 | Banerjee et al. |
| 2002/0087915 | A1 | * | 7/2002 | Perla et al. ...................... 714/15 |
| 2002/0138649 | A1 | * | 9/2002 | Cartmell et al. .............. 709/245 |
| 2002/0156799 | A1 | | 10/2002 | Markel et al. |
| 2003/0055979 | A1 | * | 3/2003 | Cooley .......................... 709/227 |
| 2003/0110285 | A1 | | 6/2003 | Banerjee et al. |
| 2004/0006652 | A1 | * | 1/2004 | Prall et al. ..................... 709/318 |
| 2004/0148568 | A1 | | 7/2004 | Springer |
| 2004/0168100 | A1 | * | 8/2004 | Thottan et al. ..................... 714/4 |
| 2004/0205076 | A1 | * | 10/2004 | Huang et al. .................. 707/100 |
| 2004/0226002 | A1 | * | 11/2004 | Larcheveque et al. ........ 717/126 |
| 2004/0260765 | A1 | * | 12/2004 | Re et al. ......................... 709/202 |
| 2005/0091483 | A1 | * | 4/2005 | Fascenda ....................... 713/153 |
| 2005/0091588 | A1 | | 4/2005 | Ramarao et al. |
| 2005/0144287 | A1 | * | 6/2005 | Challener et al. ............. 709/227 |
| 2005/0144531 | A1 | | 6/2005 | Challener et al. |
| 2005/0149861 | A1 | * | 7/2005 | Bishop et al. ................. 715/515 |
| 2005/0204041 | A1 | * | 9/2005 | Blinn et al. .................... 709/225 |
| 2005/0234682 | A1 | * | 10/2005 | Graves et al. ..................... 703/1 |

OTHER PUBLICATIONS

403 Errors, http://www.colba.net/~hlebo49/403.htm, May 22, 2004.*
"IP Subnet Calculation & Design Online Documentation", http://www.cisco.com/techtools/ip_addr_help.html, Nov. 9, 1999.*
Error Message 403, Google Groups, Nov. 11, 2002.*
"Design of Sites: Patterns, Principles, and Processes for Crafting a Customer-Centered Web Experience, The", Addison Wesley Professional, Jul. 22, 2002, pp. 590-597.*
XML Spy 4.0 Manual, "Validating and entering data", p. 60-66, 2001, Altova, Inc.*
K. Ari Krupnikov, "STnG—a Streaming Transformations and Glue framework," 2003, http://www.mulberrytech.com/Extreme/Proceedings/html/2003/Krupnikov01/EML2003Krupnikov01.html, data retrieved Sep. 9, 2004, pp. 1-19.

* cited by examiner

*Primary Examiner* — Thu Huynh
(74) *Attorney, Agent, or Firm* — Osha • Liang LLP

(57) ABSTRACT

In accordance with one embodiment of the present invention, there is provided a technique for context translation. According to an aspect of the technique, a mapping is consulted. The mapping maps a first message to a second message. The first message comprises a rule-specific error message that indicates one or more rules that were violated by a portion of a document. The second message comprises a context-specific message that sets forth the meaning of the error message in a particular implementation context. The second message is provided as output. Thus, the rule-specific error message is translated into the context-specific message. According to an aspect of the technique, the mapping is not embodied in executable code. As a result, the mapping can be modified without modifying and recompiling the source code of a program that consults the mapping and outputs the second message.

26 Claims, 3 Drawing Sheets

CONTEXT TRANSLATION

CROSS-REFERENCE TO RELATED APPLICATIONS

This application is related to co-pending U.S. patent application Ser. No. 10/891,977, entitled MULTITRANSFORM CONTEXT TRANSLATION, filed on Jul. 14, 2004, by Anand Hattiangadi, James A. Clark, and Konstantin Krupnikov.

BACKGROUND

Extensible Markup Language (XML) is a markup language that is designed to describe data. XML documents use a self-describing syntax. For example, using XML, one might describe a note from one person to another. The note might consist of multiple elements, such as a "to" element, a "from" element, a "head" element, and a "body" element.

An XML document is "well formed" if the XML document has the correct XML syntax. A well-formed XML document is "valid" relative to a schema if the XML document conforms to the rules expressed by the schema. Thus, an XML document may be well formed, and yet invalid relative to a particular schema.

A schema defines rules to which an XML document must conform in order to be considered valid relative to that schema. A schema may be, for example, an XML Schema or a Document Type Definition (DTD). A schema's rules might require, for example, that an XML document must have a "to" element, a "from" element, a "head" element, and a "body" element in order for the XML document to be valid relative to the schema.

To determine whether an XML document is valid relative to a schema, a program called a "validator" may process both the XML document and the schema. The validator determines whether the structure and content of the XML document conform to the rules expressed in the schema. If the validator determines that the XML document fails to conform to a rule expressed in the schema, then the validator outputs an error. The error may indicate the rule to which the XML document failed to conform. The validator may output a separate error for each detected failure to conform to the schema. The process of determining whether the XML document conforms to the schema's rules is called "validation."

XML documents may describe data in a specific contextual domain. For example, an XML document might express distinct portions of a note, or connections between network elements in a network topology. However, due to the generic nature of validators, the errors output by a validator typically convey little or no information regarding the meaning of those errors within the XML document's specific contextual domain. For example, an error might generally indicate that a particular element required by a schema was missing from an XML document, but that error would not convey specific information indicating that a particular network element was disconnected from other network elements in the network topology expressed by the XML document.

Theoretically, context translation programs might be designed to facilitate the translation of non-context-specific errors into context-specific messages. However, different validators might output different errors in response to detecting the same rule violation within an XML document. Furthermore, the errors output by a validator might change if a new version of the validator is released. If the translation mechanisms were hard-coded into a context translation program, then the context translation program's source code would need to be modified and recompiled before the context translation program could handle error messages that the context translation program was not designed to handle as of the context translation program's last compilation time.

Often, though, end users of such context translation programs would not possess the knowledge or means needed to modify and recompile source code.

SUMMARY

In accordance with one embodiment of the present invention, there is provided a technique for context translation. Using this technique, a rule-specific error message can be translated into a context-specific error message.

In one embodiment, a generic context translation program consults a mapping. The mapping is not embodied in executable code. The mapping maps a first message to a second message. The first message comprises a rule-specific error message that indicates one or more rules that were violated by a portion of a document. The second message comprises a context-specific message that sets forth the meaning of the error message in a particular implementation context. The second message is provided as output. Thus, the rule-specific error message is translated into the context-specific message. Because the mapping is not embodied in executable code, the mapping can be modified without modifying and recompiling the generic context translation program's source code.

In one embodiment, the first message is a message that was generated in response to a determination that the portion of the document violates the one or more rules. Such a determination is made during the validation of the document relative to a schema that expresses the one or more rules. While in one embodiment the schema is an XML Schema, in an alternative embodiment, the schema is a DTD.

In one embodiment, the mapping is indicated in an XML document. In one embodiment, the mapping comprises a node that is parent to two child nodes. One of the child nodes indicates the first message, and the other child node indicates the second message.

DETAILED DESCRIPTION OF EMBODIMENT(S)

Conceptual Overview

Figure 1:
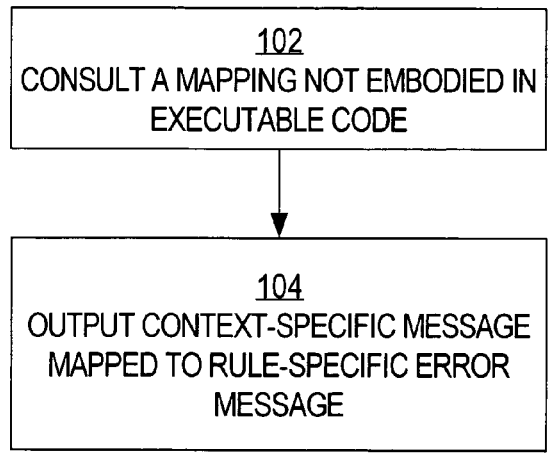
FIG. 1 is an operational flow diagram that illustrates a high level overview of the operation of one embodiment of the present invention.

In accordance with one embodiment of the present invention, there is provided a technique for context translation. An operational flow diagram, which illustrates a high level overview of the operation of one embodiment of the present invention, is shown in FIG. 1.

In one embodiment, a generic context translation program consults a mapping that is not embodied in executable code (block 102). The mapping maps a rule-specific error message to a context-specific message. The rule-specific error message indicates one or more rules that were violated by a portion of a document. The context-specific message sets forth the meaning of the error message in a particular implementation context. The context-specific error message is output (block 104).

In other aspects, the invention encompasses in some embodiments, computer apparatus, computing systems and computer-readable media configured to carry out the foregoing technique.

System Overview

Figure 2:
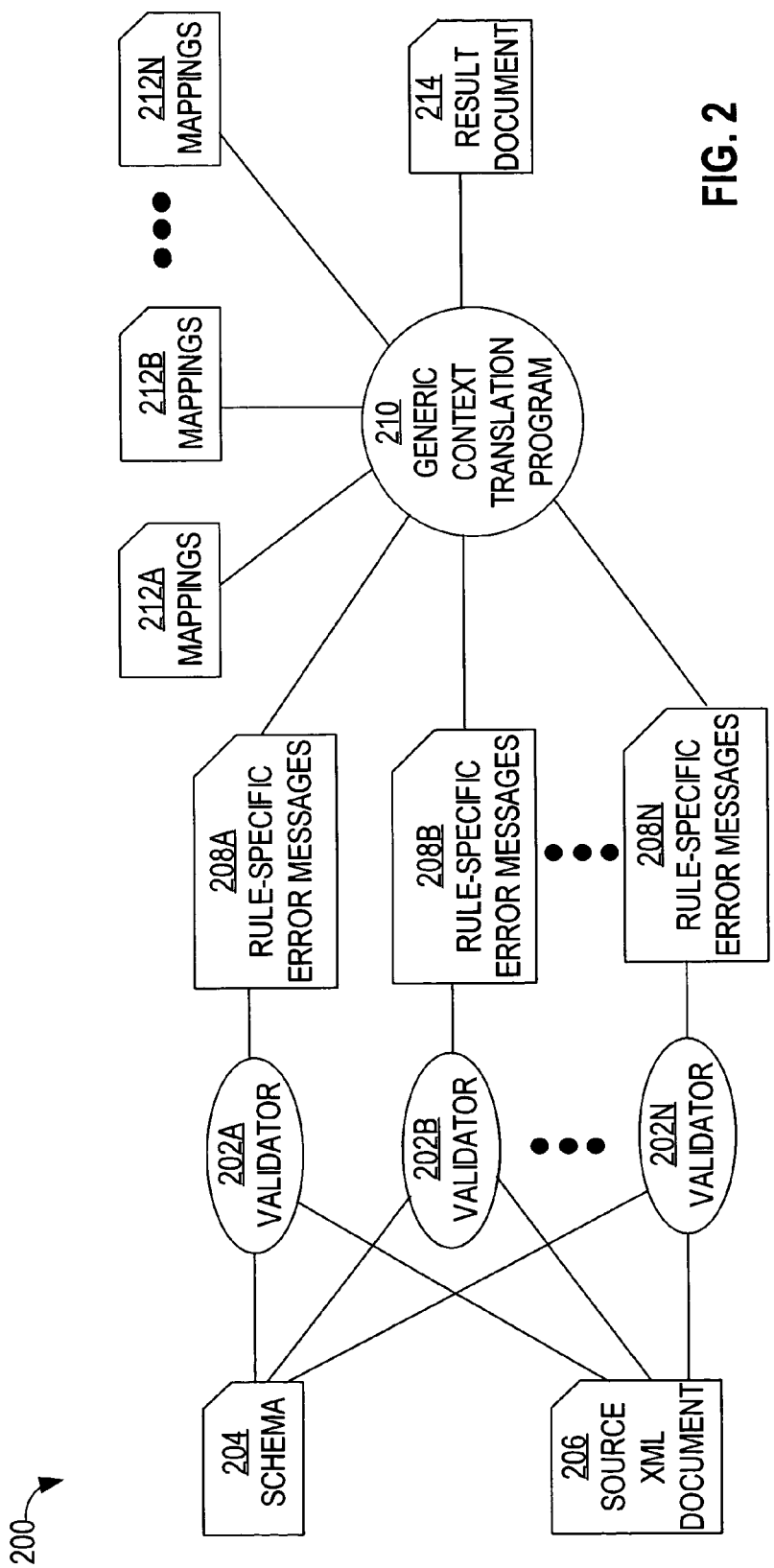
FIG. 2 is a functional block diagram that illustrates a computing environment, according to an embodiment of the present invention, in which a generic context translation program translates sets of rule-specific error messages into context-specific messages based on mappings that are not embodied in the generic context translation program.

FIG. 2 is a functional block diagram that illustrates a computing environment 200, according to an embodiment of the present invention, in which a generic context translation program 210 translates sets of rule-specific error messages 208A-N into context-specific messages based on mappings 212A-N that are not embodied in the generic context translation program.

The computing environment of FIG. 2 depicts validators 202A-N, schema 204, and source XML document 206. Although reference is made herein to source XML document 206 for purposes of illustration, embodiments of the invention may be applied to documents other than XML documents.

Each of validators 202A-N receives schema 204 and source XML document 206 as input. Each of validators 202A-N compares the content and structure of source XML document 206 with rules expressed in schema 204. In response to determinations that portions of source XML document 206 do not conform to one or more of the rules, validators 202A-N output sets of rule-specific error messages 208A-N, respectively. Each rule-specific error message indicates one or more rules that source XML document 206 violated.

Validators 202A-N may differ from each other. Because validators 202A-N may differ from each other, sets of error messages 208A-N also may differ from each other. In response to detecting the same violation of schema 204A, each of validators 202A-N may output a different set of error messages. Validators 202A-N may include, for example, Apache's Xerces, Sun's Multi-Schema Validator, Crimson, University of Edinburgh's XSV, Microsoft's MSXML, and/or other programs that determine whether XML documents conform to schemas.

According to one embodiment, generic context translation program 210 receives a particular set of rule-specific error messages, selected from among sets 208A-N, as input. In one embodiment, for each set of rule-specific error messages 208A-N, there is a corresponding mapping within mappings 212A-N. Generic context translation program 210 also receives, as input, a particular mapping that corresponds to the particular set. According to one embodiment, the particular mapping indicates associations between rule-specific error messages and context-specific messages.

In response to receiving a particular set of rule-specific error messages and a particular mapping, generic context translation program 210 consults the particular mapping outputs one or more context-specific messages that are associated, in the particular mapping, with one or more rule-specific error messages in the particular set. According to one embodiment, each such context-specific message sets forth the meaning, in a particular implementation context, of an associated rule-specific error message. For example, each context-specific message may set forth the meaning, in a network design context, of that context-specific message's associated rule-specific error message.

In one embodiment, each of mappings 212A-N indicates one or more "mapping" nodes. In one embodiment, each such "mapping" node is a parent of two other nodes: a "parser-error" node and a "domain-error" node. Within a particular "mapping" node, the "parser-error" node indicates a pattern that may match one or more rule-specific error messages, and the "domain-error" node indicates text that is to be output when the pattern is found in a set of rule-specific error messages. The text in the "domain-error" node may contain parameter text that assumes the value of a portion of a rule-specific error message that matches the associated pattern.

Thus, in one embodiment, in response to receiving a particular set of rule-specific errors and a particular mapping, generic context translation program 210 locates those of the particular set's errors that match patterns indicated in the particular mapping. When generic context translation program 210 locates such a rule-specific error, generic context translation program outputs the text that is associated, in the particular mapping, with the pattern that the rule-specific error matches. In one embodiment, when generic context translation program 210 determines that a rule-specific error does not match any pattern indicated in the particular mapping, generic context translation program 210 outputs the rule-specific error message itself. Generic context translation program 210 may output messages by writing the messages into a result document 214.

According to one embodiment, mappings 212A-N are not embodied in executable code, and can be modified without modifying and/or recompiling the source code of generic context translation program 210. Mappings 212A-N may be XML documents, for example. According to one embodiment, generic context translation program 210 is generic in the sense that generic context translation program 210 can perform context translation based on any of a variety of different mappings; the mappings are not hard-coded into generic translation program 210.

Sample Operation

A sample operation of computing environment 200 in accordance with one embodiment of the present invention will now be described. In the following discussion, reference will be made to the functional block diagram of FIG. 2 and the flow diagram of FIG. 3.

Figure 3:
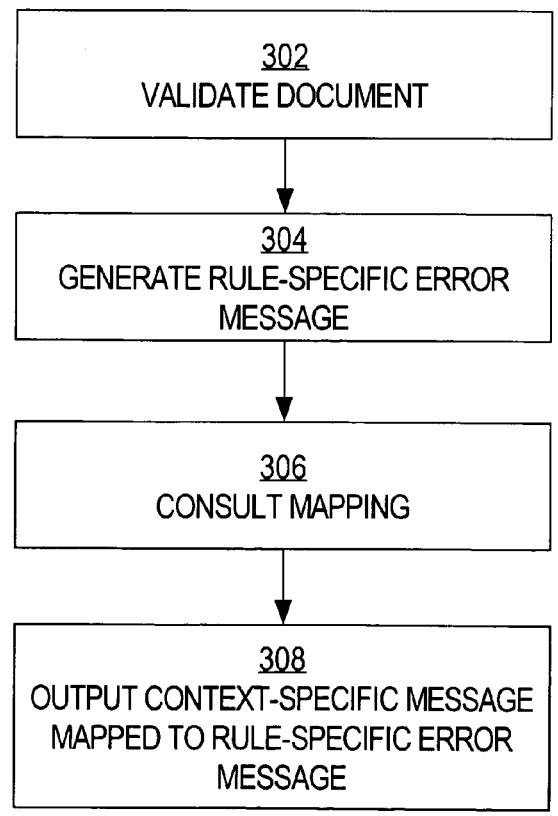
FIG. 3 is an operational flow diagram that illustrates the operation of one embodiment of the present invention.

Referring to FIG. 3, a document is validated relative to a set of rules (block 302). For example, validator 202A may validate source XML document 206 relative to rules expressed in schema 204. For another example, validator 202B may validate source XML document 206 relative to rules expressed in schema 204. An example of a source XML document is depicted in Table 1 below.

TABLE 1

EXAMPLE SOURCE XML DOCUMENT

<?xml version='1.0'?>
<!DOCTYPE farm SYSTEM 'farm.dtd'>
<farm>
   <!-- . . . -->
   <subnet id='snet'/>
   <server name='srv'>
     <connectedTo subnet='subnet'/>
   </server>
   <!-- . . . -->
</farm>

An example of a schema that might be used to validate the source XML document of Table 1 is depicted in Table 2 below.

TABLE 2

EXAMPLE SCHEMA

```
<!ENTITY % farm-cm-other " ">
<!ELEMENT farm (subnet  |   server %farm-cm-other;)*>
<!ELEMENT subnet EMPTY>
<!ATTLIST subnet id ID #REQUIRED>
<!ELEMENT server (connectedTo)>
<!ATTLIST server name       NMTOKEN    #REQUIRED
                 ipAddress  CDATA      #REQUIRED>
<!ELEMENT connectedTo EMPTY>
<!ATTLIST connectedTo subnet IDREF #REQUIRED>
<!-- . . . additional declarations . . . -->
```

Referring again to FIG. 3, a rule-specific error message is generated in response to a determination that a portion of the document violates one or more rules in the set of rules (block 304). For example, validator 202A may generate a set of rule-specific error messages 208A in response to determining that portions of source XML document 206 violate one of more of the rules. For another example, validator 202B may generate set of rule-specific error messages 208B in response to determining that portions of source XML document 206 violate one of more of the rules. However, set of rule-specific error messages 208A may differ from set of rule-specific error messages 208B. An example of a set of rule-specific error messages that might result if the XML document of Table 1 were validated against the schema of Table 2 is depicted in Table 3 below.

TABLE 3

EXAMPLE SET OF RULE-SPECIFIC ERROR MESSAGES

[Error] farm-bad1.xml:6:22: Attribute "ipAddress" is required and must be specified for element type "server".
[Error] farm-bad1.xml:10:8: An element with the identifier "subnet" must appear in the document.

Referring again to FIG. 3, a mapping is consulted (block 306). The mapping maps the rule-specific error message to a context-specific message that sets forth the meaning, in a particular implementation context, of the rule-specific error message. For example, generic context translation program 210 may consult mappings 212A in response to receiving rule-specific error messages 208A. For another example, generic context translation program may consult mappings 212B in response to receiving rule-specific error messages 208B. An example of mappings is depicted in Table 4 below.

TABLE 4

EXAMPLE MAPPINGS

```
<?xml version='1.0'?>
<!DOCTYPE mappings SYSTEM 'mappings.dtd'>
<mappings>
  <mapping xml:lang='en-US'>
    <parser-error>
      Attribute "ipAddress" is required and must be specified for
      element type "server".
    </parser-error>
    <domain-error>
      Server has no IP address set.
      <more>All servers must have IP addresses to connect to the
      network.</more>
    </domain-error>
```

TABLE 4-continued

EXAMPLE MAPPINGS

```
  </mapping>
  <mapping xml:lang="en-US">
    <parser-error>
      The content of element type "server" is incomplete, it must
      match "(connectedTo)".
    </parser-error>
    <domain-error>
      Server is not connected to the network.
      <more>All nodes must connect to a network subnet.
      Disconnected islands are not permitted.</more>
    </domain-error>
  </mapping>
  <mapping xml:lang="en-US">
    <parser-error>
      An element with the identifier "([ˆ "]*)" must appear in the
      document.
    </parser-error>
    <domain-error>
      Server is not connected to an existing subnet.
      <more>This server specifies "$1" as the subnet it is
      connected to, but no such subnet exists in this
      farm.</more>
    </domain-error>
  </mapping>
</mappings>
```

There are three "mapping" nodes shown in Table 4. Each "mapping" node is the parent of two separate child nodes: a "parser-error" node and a "domain-error" node that is associated with that "parser-error" node. In one embodiment, it is determined whether the rule-specific error matches any of the patterns indicated in any of the "parser-error" nodes. For example, generic context translation program 210 may make such a determination.

Referring again to FIG. 3, the context-specific message that is mapped to the rule-specific error message is output (block 308). For example, in response to determining that the rule-specific error message is "Attribute 'ipAddress' is required and must be specified for element type 'server'," generic context translation program 210 may output the associated network design context-specific error message, "Server has no IP address set. <more>All servers must have IP addresses to connect to the network.</more>." For another example, in response to determining that the rule-specific error message is "The content of element type 'server' is incomplete, it must match '(connectedTo),'" generic context translation program 210 may output the associated network design context-specific error message, "Server is not connected to the network. <more>All nodes must connect to a network subnet. Disconnected islands are not permitted.</more>." An example of the context-specific messages that generic context translation program 210 might output in response to matching the rule-specific error messages of Table 3 with the mappings of Table 4 are depicted in Table 5 below.

TABLE 5

EXAMPLE CONTEXT-SPECIFIC MESSAGES

```
<?xml version="1.0" encoding="UTF-8"?>
<error-report>
  <error xml:lang="en-US">
    Server "<server-name>srv</server-name>" has no IP address set.
    <more>All servers must have IP addresses to connect to the
    network.</more>
  </error>
  <error xml:lang="en-US">
```

TABLE 5-continued

EXAMPLE CONTEXT-SPECIFIC MESSAGES

```
    Server "<server-name>srv</server-name>" is not connected to an
        existing subnet.
        <more>This server specifies "<subnet-name>subnet</subnet-
        name>" as the subnet it is connected to, but no such subnet
        exists in this farm.
        </more>
    </error>
</error-report>
```

Thus, although rule-specific error messages 208A-N may differ, mappings 212A-N may map different but context-equivalent rule-specific error messages to the same context-specific messages. Different rule-specific errors that have the same meanings in a particular context may be mapped to the same context-specific message. As a result, the output of generic context translation program 210 will be consistent relative to a particular context regardless of which of validators 202A-N produced the rule-specific error messages that generic context translation program 210 receives. The developers of validators 202A-N may provide different mappings that generic context translation program 210 can use to map the rule-specific error messages output by those validators to the same context-specific messages.

Hardware Overview

Figure 4:
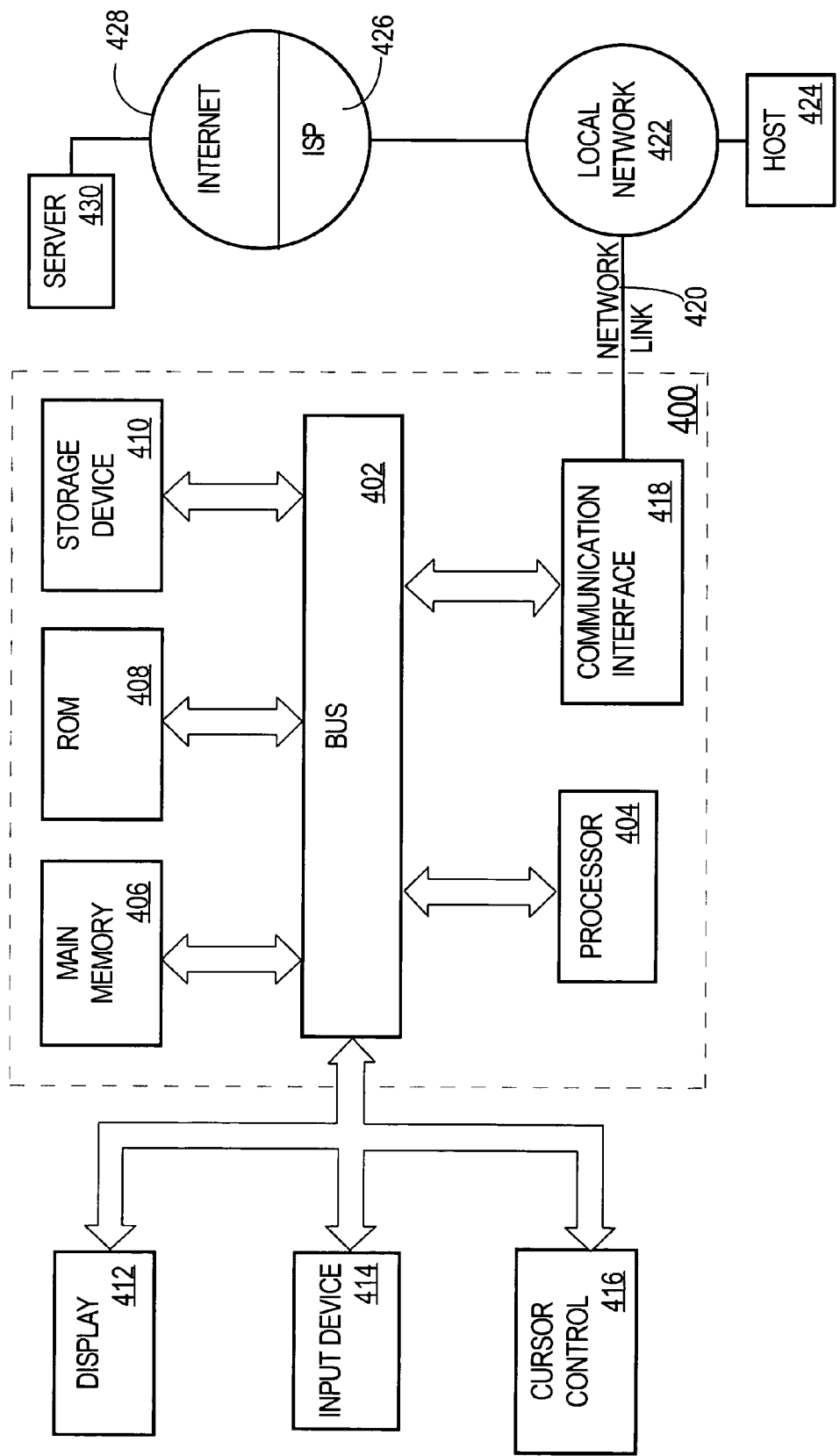
FIG. 4 is a hardware block diagram of an example computer system, which may be used to embody one or more components of an embodiment of the present invention.

FIG. 4 is a block diagram that illustrates a computer system 400 upon which an embodiment of the invention may be implemented. Computer system 400 includes a bus 402 for facilitating information exchange, and one or more processors 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions by processor 404. Computer system 400 may further include a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

In computer system 400, bus 402 may be any mechanism and/or medium that enables information, signals, data, etc., to be exchanged between the various components. For example, bus 402 may be a set of conductors that carries electrical signals. Bus 402 may also be a wireless medium (e.g. air) that carries wireless signals between one or more of the components. Bus 402 may also be a medium (e.g. air) that enables signals to be capacitively exchanged between one or more of the components. Bus 402 may further be a network connection that connects one or more of the components. Overall, any mechanism and/or medium that enables information, signals, data, etc., to be exchanged between the various components may be used as bus 402.

Bus 402 may also be a combination of these mechanisms/media. For example, processor 404 may communicate with storage device 410 wirelessly. In such a case, the bus 402, from the standpoint of processor 404 and storage device 410, would be a wireless medium, such as air. Further, processor 404 may communicate with ROM 408 capacitively. In this instance, the bus 402 would be the medium (such as air) that enables this capacitive communication to take place. Further, processor 404 may communicate with main memory 406 via a network connection. In this case, the bus 402 would be the network connection. Further, processor 404 may communicate with display 412 via a set of conductors. In this instance, the bus 402 would be the set of conductors. Thus, depending upon how the various components communicate with each other, bus 402 may take on different forms. Bus 402, as shown in FIG. 4, functionally represents all of the mechanisms and/or media that enable information, signals, data, etc., to be exchanged between the various components.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, it should be noted that although the invention has been described with reference to one embodiment, it should not be construed to be so limited. Various modifications may be made by those of ordinary skill in the art with the benefit of this disclosure without departing from the spirit of the invention. Thus, the invention should not be limited by the embodiments used to illustrate it but only by the scope of the issued claims. The specification and drawings are, accordingly, to be regarded as illustrative rather than limiting.

What is claimed is:

1. A method performed by a computer program, the method comprising:
   receiving a first message that comprises a rule-specific error message that indicates one or more rules that were violated by a portion of an Extensible Markup Language (XML) document as a result of that portion not complying with a specified schema that is one of: (a) an XML schema and (b) a Document Type Definition (DTD);
   wherein the computer program does not receive, with the first message, a second message that comprises a context-specific message that sets forth the meaning of the error message in a particular implementation context;
   in response to receiving the first message, determining, based on a first mapping, that the first message is mapped to the second message, wherein the first mapping is not embodied in executable code; and
   in response to determining that the first message is mapped to the second message, outputting the second message.

2. The method of claim 1, further comprising:
   validating the document relative to a set of rules, wherein the set of rules contains the one or more rules; and
   generating the first message in response to a determination that the portion of the document violates the one or more rules.

3. The method of claim 1, wherein the schema is an Extensible Markup Language (XML) Schema; and wherein receiving the first message comprises reading the first message from a computer-readable storage medium to which a validator that validated the document against the specified schema wrote the first message.

4. The method of claim 1, wherein the schema is a Document Type Definition (DTD).

5. The method of claim 1, wherein the first message does not set forth the meaning of the error message in the particular implementation context.

6. The method of claim 1, wherein the first mapping is indicated in an Extensible Markup Language (XML) document.

7. The method of claim 1, wherein the first mapping comprises a first node, wherein the first node is a parent of a second node and a third node, wherein the second node indicates the first message, and wherein the third node indicates the second message.

8. The method of claim 1, wherein the first mapping can be modified without modifying the program.

9. The method of claim 1, further comprising:
   consulting a second mapping that maps a third message to the second message, wherein the second mapping differs from the first mapping, wherein the third message differs from the first message, wherein the third message comprises a rule-specific error message that indicates one or more rules that were violated by a portion of a document, and wherein the second mapping is not embodied in executable code; and
   outputting the second message in response to a determination that the third message is mapped to the second message.

10. The method of claim 1, wherein the particular implementation context is a network configuration context.

11. The method of claim 1, wherein the first message indicates that a particular attribute must be specified for a particular element type, and wherein the second message indicates that a server lacks an Internet Protocol (IP) address.

12. The method of claim 1, wherein the first message indicates that the content of a particular element is incomplete, and wherein the second message indicates that a server is not connected to a network.

13. The method of claim 1, wherein the first message indicates that an element with a particular identifier must appear in the document, and wherein the second message indicates that a network lacks a subnet that is identified by the particular identifier.

14. A non-transitory computer-readable medium carrying one or more sequences of instructions, which instructions, when executed by one or more processors, cause the one or more processors to carry out the steps of:
receiving, at a computer program, a first message that comprises a rule-specific error message that indicates one or more rules that were violated by a portion of an Extensible Markup Language (XML) document as a result of that portion not complying with a specified schema that is one of: (a) an XML schema and (b) a Document Type Definition (DTD);
wherein the computer program does not receive, with the first message, a second message that comprises a context-specific message that sets forth the meaning of the error message in a particular implementation context;
in response to receiving the first message, determining, based on a first mapping, that the first message is mapped to the second message, wherein the first mapping is not embodied in executable code; and
in response to determining that the first message is mapped to the second message, outputting the second message.

15. The non-transitory computer-readable medium of claim 14, further comprising instructions for carrying out the steps of:
validating the document relative to a set of rules, wherein the set of rules contains the one or more rules; and
generating the first message in response to a determination that the portion of the document violates the one or more rules.

16. The non-transitory computer-readable medium of claim 14, wherein the schema is an Extensible Markup Language (XML) Schema; and wherein receiving the first message comprises reading the first message from a computer-readable storage medium to which a validator that validated the document against the specified schema wrote the first message.

17. The non-transitory computer-readable medium of claim 14, wherein the schema is a Document Type Definition (DTD).

18. The non-transitory computer-readable medium of claim 14, wherein the first message does not set forth the meaning of the error message in the particular implementation context.

19. The non-transitory computer-readable medium of claim 14, wherein the first mapping is indicated in an Extensible Markup Language (XML) document.

20. The non-transitory computer-readable medium of claim 14, wherein the first mapping comprises a first node, wherein the first node is a parent of a second node and a third node, wherein the second node indicates the first message, and wherein the third node indicates the second message.

21. The non-transitory computer-readable medium of claim 14, wherein the first mapping can be modified without modifying the program.

22. The non-transitory computer-readable medium of claim 14, further comprising instructions for carrying out the steps of:
consulting a second mapping that maps a third message to the second message, wherein the second mapping differs from the first mapping, wherein the third message differs from the first message, wherein the third message comprises a rule-specific error message that indicates one or more rules that were violated by a portion of a document, and wherein the second mapping is not embodied in executable code; and
outputting the second message in response to a determination that the third message is mapped to the second message.

23. The non-transitory computer-readable medium of claim 14, wherein the particular implementation context is a network configuration context.

24. The non-transitory computer-readable medium of claim 14, wherein the first message indicates that a particular attribute must be specified for a particular element type, and wherein the second message indicates that a server lacks an Internet Protocol (IP) address.

25. The non-transitory computer-readable medium of claim 14, wherein the first message indicates that the content of a particular element is incomplete, and wherein the second message indicates that a server is not connected to a network.

26. The non-transitory computer-readable medium of claim 14, wherein the first message indicates that an element with a particular identifier must appear in the document, and wherein the second message indicates that a network lacks a subnet that is identified by the particular identifier.

* * * * *